Figure 3:
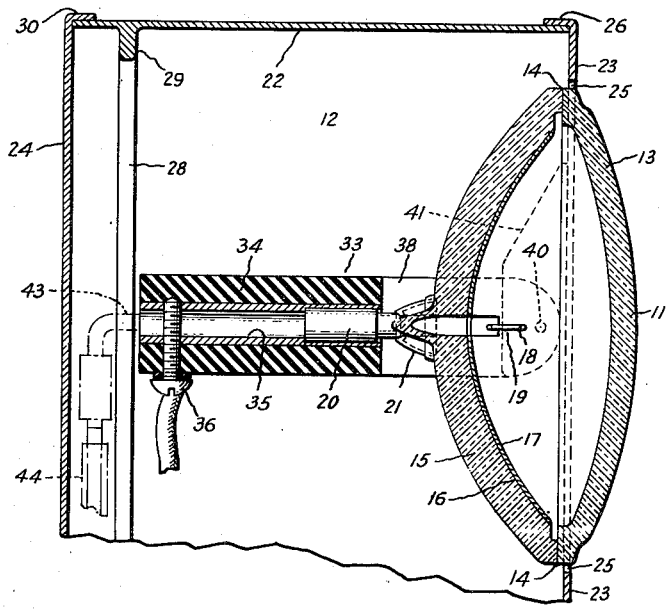

Oct. 25, 1938.   W. L. ENFIELD   2,134,551
LIGHT PROJECTING DEVICE
Filed March 26, 1937   3 Sheets-Sheet 1
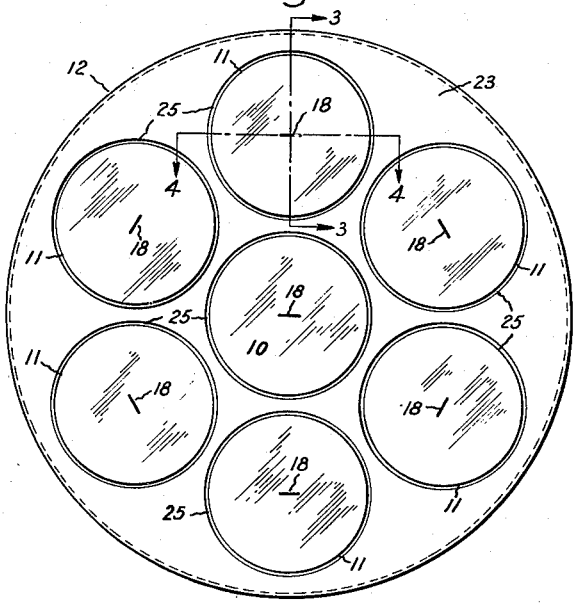
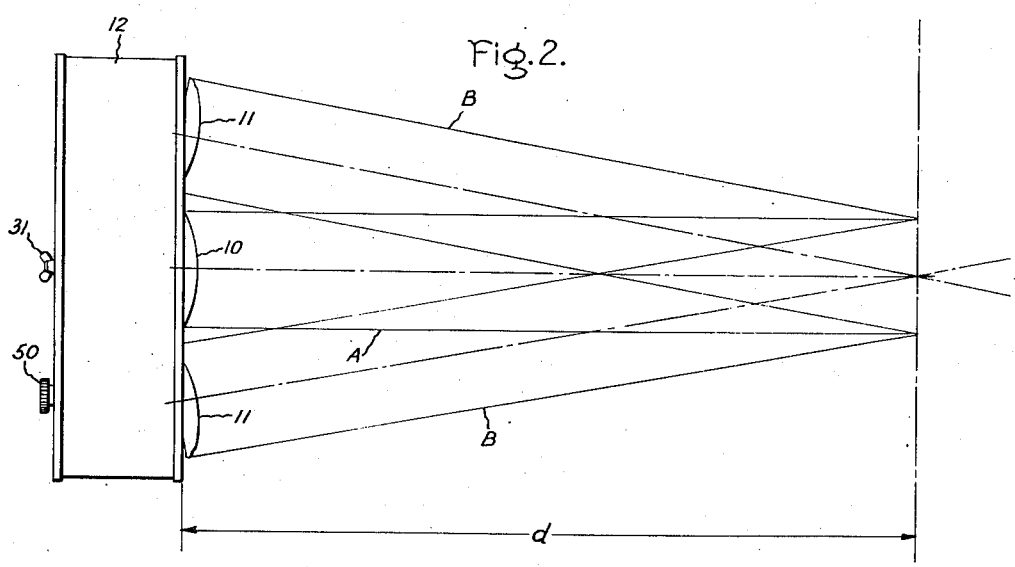
Inventor:
William L. Enfield,
by Harry E. Dunham
His Attorney.

Oct. 25, 1938.  W. L. ENFIELD  2,134,551
LIGHT PROJECTING DEVICE
Filed March 26, 1937   3 Sheets-Sheet 2

Inventor:
William L Enfield,
by Harry E. Dunham
His Attorney.

Aug. 28, 1951 L. E. DOUGHERTY 2,565,551
TORQUE CONVERTER
Filed July 8, 1949 3 Sheets-Sheet 3
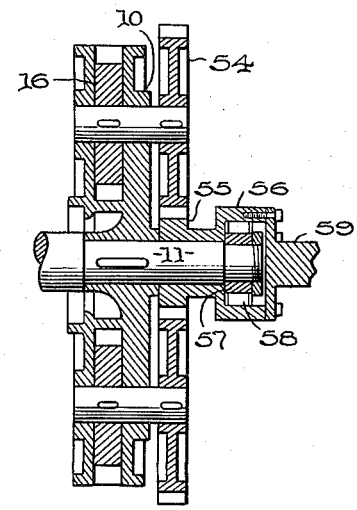
Fig. 6.
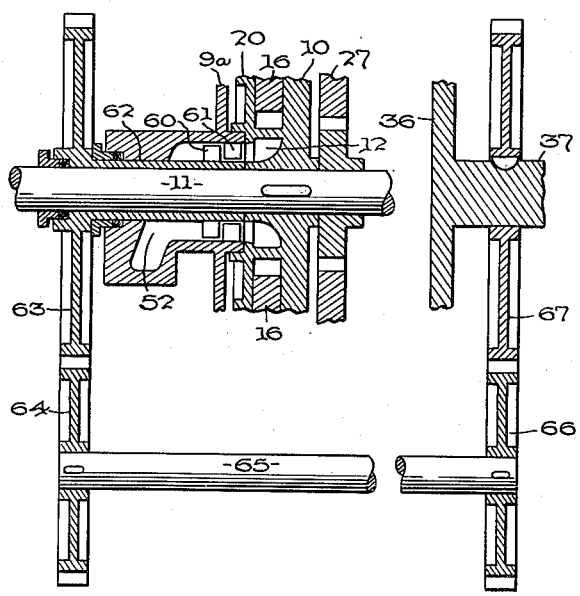
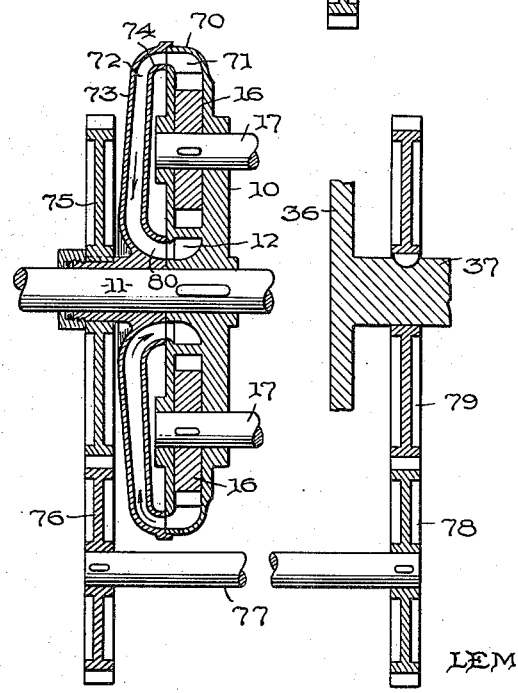
Fig. 8.
INVENTOR.
LEMUEL E. DOUGHERTY
BY
Ralph B. Stewart
ATTORNEY Patented Oct. 25, 1938

2,134,551

UNITED STATES PATENT OFFICE 2,134,551

LIGHT PROJECTING DEVICE

William L. Enfield, Shaker Heights, Ohio, assignor to General Electric Company, a corporation of New York Application March 26, 1937, Serial No. 133,220

2 Claims. (Cl. 240—41.35)

My invention relates to light projecting devices generally and more particularly to such devices suitable for use where a concentrated beam of light is desired at a given distance from the device, for example, in moving picture studios and theaters, although it is readily adapted to office and factory lighting and other types of light projection.

My projection device advantageously employs reflector lamp units of the type described and claimed in co-pending application Serial No. 68,713, filed March 13, 1936, by Daniel K. Wright. In lamps of this type, a filament or other concentrated light source is precisely positioned at the focal point of the accurately formed glass parabolic reflector portion of the lamp, thereby resulting in the projection of a powerful and efficient beam of light.

One object of my invention is the provision of a light and compact light projection device of limited depth, consisting of a plurality of lamp units, preferably of the type disclosed in the aforementioned co-pending application, mounted in a holder in a plane common to all of said lamp units.

Another object is the provision of a light projection device consisting of a fixed central reflector lamp surrounded by a ring of reflector lamps, some or all of which may be adjustable.

Still another object of my invention is the provision of a light projection device comprising a plurality of individual reflector lamps adapted to project a beam of light which may be concentrated or focused at substantially any given distance from said device, the cross-sectional size of the composite beam at such point of concentration being no greater than that of one of the constitutent beams.

A further object of my invention is the provision of means for focusing or concentrating the beams of light projected by the various reflector lamps mounted within my projection device at any given distance from the same.

A still further object is the provision of pivotal mountings for the adjustable lamps of my projection device whereby said lamps are capable of pivotal movement in a plane radial to the central lamp of said device.

Figure 4:
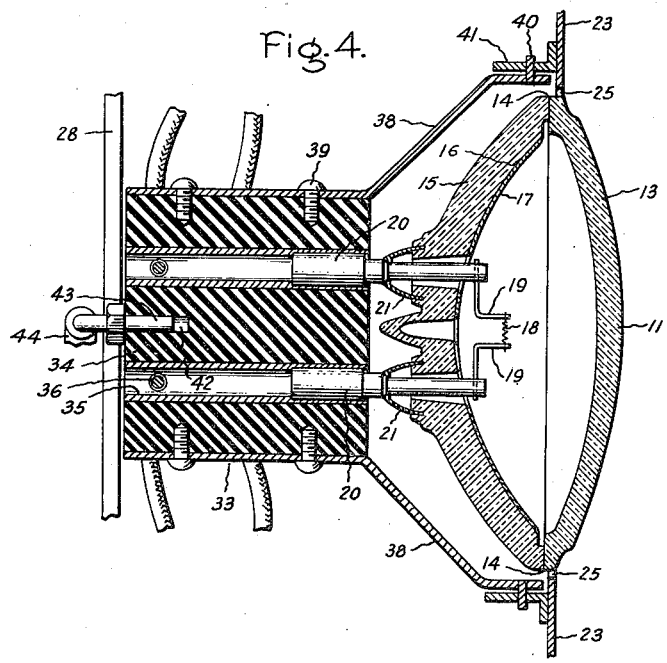

Other objects and advantages of my invention will be apparent from the following detailed description of a species thereof and from the accompanying drawings, in which:

Fig. 1 is a front elevation of a projection device comprising my invention, showing the arrangement of the various individual reflector lamp units included therein; Fig. 2 is a side elevation of my projection device, further illustrating diagrammatically the manner in which the beams of light from the various individual adjustable lamp units may be concentrated or focused at any given distance from the projection device; Fig. 3 is a vertical sectional view taken on the line 3—3 of Fig. 1; Fig. 4 is a horizontal sectional view taken on the line 4—4 of Fig. 1; and Fig. 5 is a rear elevation of my projection device with a portion of the rear cover plate broken away.

Referring to the drawings, my projection device comprises a central reflector lamp unit 10 surrounded by a group of adjustable reflector lamp units 11, all mounted in a holder 12. The holder may be made of Dural metal or any othe suitable light weight material. The reflector lamps are of the type disclosed in the previously mentioned co-pending application Serial No. 68,713, each comprising a lens 13 sealed at the periphery thereof, at 14, to a preformed reflector portion 15. This reflector portion is made of pressed glass, the interior surface 16 of which is preferably of paraboloidal shape and covered with a coating 17 of aluminum, for example, constituting a reflecting surface. A concentrated light source, comprising a bar filament 18 disposed transversely of the reflector axis, is mounted within the lamp by lead wires 19, terminal prong members 20, and metal cups 21, and is accurately positioned at the focal point of the reflector surface 17. The greater accuracy with which the pressed glass paraboloidal interior surface 16 can be formed over the conventional stamped metal reflectors, together with the extremely accurate disposition of the concentrated light source 18 at the focal point of the reflector surface 17, results in the projection of a powerful and efficient beam of light.

The holder 12 is drum shaped and comprises a cylindrical body portion 22, a front cover 23, and a rear cover 24. The front cover 23 is provided with a plurality of openings 25 adapted to receive the various reflector lamps 10, 11. A peripheral flange 26 formed on said front cover is adapted to telescopically engage with the cylindrical body portion 22 to thereby secure said parts together. The body portion 22 is formed adjacent the rear extremity thereof with spider-like reinforcing means comprising a hub 27 and a plurality of spokes or arms 28 connecting said hub with a circumferential strengthening flange 29 extending inwardly from the inner cylindrical surface of the body portion. The rear cover 24 is formed with a peripheral flange 30, similar to the flange 26 on the front cover, for telescopic engagement with the rear extremity of the cylindrical body portion 22. The rear cover is securely fastened to the body portion by a pair of wing nuts 31, 31, which are adapted to be threaded on a pair of bolts 32, 32 fastened to certain of the arms 28.

Whereas the central lamp 10 is fixedly mounted in the holder 12 with its reflector axis substantially parallel to the axis of said holder, the surrounding ring of lamps 11 are adjustably mounted in said holder. Referring to Figs. 3 and 4, each of the adjustable lamps 11 is inserted in a socket 33 pivotally mounted on the rear of the front cover 23 of the holder 12. Each socket 33 comprises an insulating member 34 preferably formed of hard rubber or the like and provided with a pair of hollow metallic cylinders or contact members 35, 35 adapted to receive, and convey current to, the terminal members 20 of the reflector lamp 11. The contact members in each socket 33 are connected to the electrical circuit by means of the bolts 36, 36 and connecting wires, it being understood that all of the sockets in the projection unit are connected together to constitute one electrical circuit. A toggle or other type of switch 37 may be inserted in the circuit to energize or de-energize the same. The socket contact members 35 are adapted to mount the adjustable lamp 11 in such a position that the reflector axis thereof will lie in a plane X—X common to such axis and to the axis of the central reflector lamp 10. The socket 33 is pivotally mounted at the rear of the front cover 23 of the holder by means of a pair of arms 38, 38 which are fastened to the insulating member 34 by screws 39 and pivoted on the pins 40, 40 located adjacent the rear surface of the front cover. These pins 40, 40 extend from supporting brackets 41, 41 rigidly secured to the rear surface of the front cover 23.

As is evident from Figs. 3, 4 and 5, the bar filament 18 and terminal members 20, 20 of the lamp 11, together with the socket contact members 35, 35 and pins 40, 40, all lie in a common plane Y—Y (Fig. 5), which plane is perpendicular to the radial plane X—X common to the axes of the central reflector lamp 10 and the adjustable reflector lamp 11. Thus, rotation of the socket 33 on the pins 40, 40 will cause the reflector axis of the adjustable lamp 11 to assume various tilted positions within the radial plane X—X.

While I have described the pivotal mounting of only one adjustable lamp 11, it should be understood that each of the other adjustable lamps 11 is provided with a similar mounting and is adapted to be tilted or rotated in a similar manner.

Various modifications of the pivotal mounting described above may be employed in place thereof. For instance, the mounting may consist of a pivotally mounted element or elements adapted to engage the periphery of the reflector lamp 11 and support the same at such point, instead of engaging and supporting such lamp at the terminal members.

The rotatable sockets 33 may be either separately or individually controlled, or they may be simultaneously controlled, as is desired. In the accompanying drawings, I have illustrated one type of means for simultaneously controlling rotative movement of all the adjustable lamps 11.

Referring to Figs. 4 and 5, the insulating member 34 of each socket 33 is provided with a centrally located opening 42 adapted to pivotally receive a finger 43 extending from one end of a control arm 44. This control arm 44 is pivoted at its other end, at 45, to a control lever 46, and the latter is, in turn, pivoted at one end on the shaft 47. The other end of the control lever 46 is provided with a threaded shaft or bolt 48 adapted to project through and slide in a concentric slot 49 formed in the rear cover 24 of the holder. A knurled control knob 50, threaded on the bolt 48 outwardly of the rear cover 24, is adapted to operate the control lever 46.

It will be observed from Fig. 5 that the point of pivotal connection 45 of the control arm 44 and control lever 46 is removed some distance from the center of the control lever shaft 47, and also from the radial plane X—X. Accordingly, rotation of the control lever 46 will cause the control arm 44 to rotate the socket 33 about the pins 40, 40 either radially inward or outward, depending, of course, upon the direction of rotation of the control lever. Thus, in Fig. 5, clockwise rotation of the control lever 46 causes the socket 33 to be rotated radially inward, while counterclockwise rotation of said control lever causes the socket to be rotated radially outward. From Fig. 3, it will be understood that outward rotation of the socket 33 about pins 40, 40 causes the reflector axis of the lamp 11 to be tilted or directed inwardly towards the reflector axis of the central lamp 10, while inward rotation of the socket 33 causes the reflector axis of lamp 11 to be directed outwardly or away from the reflector axis of the central lamp.

Each lamp 11 is connected to the control lever 46 by a control arm 44 similar to the one described above. By means of the screw and slot adjustment device 51 provided in each control arm 44, the position of the various lamps 11 can be so adjusted that for any one setting of the control lever 46, the reflector axes of all the lamps 11 will be directed the same amount inwardly towards or outwardly away from the reflector axis of the central lamp 10. Thus, referring to Fig. 2, the beams of light projected by the various lamps 11 can be quickly and simultaneously concentrated at any distance $d$ from the projection device. To concentrate or focus the composite beam on an object comparatively near said projection unit, it is only necessary to rotate the control lever 46 counterclockwise the required amount. Likewise, to focus the beam on an object fairly distant from said projection device, the control lever is rotated clockwise the required amount.

In Fig. 2, the beam of light A projected by the central lamp 10, and the beams B projected by the adjustable lamps 11, are shown focused or concentrated at the distance $d$ from the projection unit. It is quite obvious from this illustration that the cross-sectional area or size of the composite beam at the distance $d$ is limited in degree of concentration only by the cross-sectional area or size of one of the constituent beams A or B at such distance $d$.

If, in addition to a concentrated beam of light, a certain amount of asymmetrical illumination is desired, the same may be provided in a number of ways. Thus, where the various adjustable lamps are separately or individually controlled, such asymmetrical illumination may be obtained by simply positioning one or more of said adjustable lamps out of focus with the others, while in the case of simultaneously controlled lamps it may be readily obtained by adjusting the length of the connecting arms 44 of one or more of the adjustable lamps the required amount, through the medium of the adjustment devices 51 provided therefor. Alternatively, such asymmetrical illumination may be secured by providing one or more of the lamps with either asymmetrical lenses or reflectors, or by altering the pivotal mounting of one or more of the adjustable lamps.

If desired, a plurality of my projection devices may be grouped together in the same manner as the individual lamps 10 and 11 are grouped in one of my devices, and the same provided with similar control means for projecting and concentrating a still more powerful beam of light which, however, will still be limited in degree of concentration only by the cross-sectional size of one of the constituent beams A or B. Thus a beam of light of extremely high intensity can be projected onto the object desired to be illuminated. Obviously, the process of grouping a plurality of my projection devices together may be theoretically continued indefinitely while still maintaining the same cross-sectional size of the composite beam at the point of concentration as that of one of the constituent beams A or B.

From the foregoing description, it will be apparent that I have provided a projection device which is simple in construction and positive in operation, whereby a powerful beam of light may be focused or concentrated at substantially any given distance in front of the same. Said beam, at the point of focus, will be concentrated into an area appreciably smaller than that possible with a lamp comprising a single reflector of approximately the same diameter as that of my projection device. In other words, I am able to obtain with my construction of lamp a concentrated beam of considerably higher intensity than that obtainable from a single lamp of substantially equivalent size. Furthermore, the use of a plurality of reflector lamps of the type shown in the drawings, having a limited depth, has enabled me to construct a projection device which is light in weight and compact in size, thereby facilitating transportation of the same.

What I claim as new and desire to secure by Letters Patent of the United States is:

1. A light projecting device comprising a support member, a plurality of annularly arranged holders for supporting light-concentrating lamp units, said holders being pivotally mounted in said support member for rotation in radial planes passing through the axis about which said holders are arranged to permit convergence of the beams from the lamp units at a desired distance ahead of the device, and means for pivoting said holders comprising a control lever pivotally mounted at one end on the said axis of the holders, and control arms pivotally connecting said holders with said end of said lever, the pivotal connections of said arms to said lever being at points concentrically disposed about the said axis whereby movement of the opposite end of said control lever causes said lamp holders to be simultaneously pivoted to permit convergence of the beams from the lamps.

2. A light projecting device comprising a support member, a plurality of annularly arranged holders for supporting light-concentrating lamp units, said holders being pivotally mounted in said support member for rotation in radial planes passing through the axis about which said holders are arranged to permit convergence of the beams from the lamp units at a desired distance ahead of the device, and means for pivoting said holders comprising a control lever pivotally mounted at one end on the said axis of the holders, and control arms pivotally connecting said holders with said end of said lever, each of said arms being longitudinally extensible to permit variation in the original aiming of said lamp units, the pivotal connections of said arms to said lever being at points concentrically disposed about the said axis whereby movement of the opposite end of said control lever causes said lamp holders to be simultaneously pivoted to permit convergence of the beams from the lamps.

WILLIAM L. ENFIELD.